US012354099B2

(12) United States Patent
Malasi et al.

(10) Patent No.: US 12,354,099 B2
(45) Date of Patent: Jul. 8, 2025

(54) DYNAMIC GATEWAY SELECTION

(71) Applicant: PAYU PAYMENTS PRIVATE LTD., Mumbai (IN)

(72) Inventors: Vivek Malasi, Haryana (IN); Sagar Kumar V, Karnataka (IN); Sudhindra Magadi S, Karnataka (IN); Sudeep Nayak, Karnataka (IN)

(73) Assignee: PAYU PAYMENTS PRIVATE LTD., Mumbai (IN)

( * ) Notice: Subject to any disclaimer, the term of this patent is extended or adjusted under 35 U.S.C. 154(b) by 224 days.

(21) Appl. No.: 17/717,360

(22) Filed: Apr. 11, 2022

(65) Prior Publication Data

US 2023/0325832 A1 Oct. 12, 2023

(51) Int. Cl.
*G06Q 20/40* (2012.01)
*G06Q 20/06* (2012.01)

(52) U.S. Cl.
CPC ....... *G06Q 20/4012* (2013.01); *G06Q 20/065* (2013.01); *G06Q 20/405* (2013.01)

(58) Field of Classification Search
CPC ............ G06Q 20/4012; G06Q 20/065; G06Q 20/405; G06Q 20/10; G06Q 40/02; G06Q 20/027

USPC .......................................................... 705/64
See application file for complete search history.

(56) References Cited

U.S. PATENT DOCUMENTS

| | | | |
|---|---|---|---|
| 7,774,402 B2 | 8/2010 | Singh et al. | |
| 8,639,846 B2 | 1/2014 | Singh et al. | |
| 11,080,711 B2 | 8/2021 | Levy et al. | |
| 11,836,715 B1* | 12/2023 | Dinan | G06Q 20/3676 |
| 2007/0233603 A1 | 10/2007 | Schmidgall et al. | |
| 2020/0058029 A1* | 2/2020 | Spitz | G07F 9/001 |
| 2020/0134628 A1* | 4/2020 | Jia | G06N 20/00 |
| 2021/0125179 A1* | 4/2021 | Mach | G06Q 20/401 |
| 2022/0222662 A1* | 7/2022 | Ketharaju | G06Q 20/401 |

FOREIGN PATENT DOCUMENTS

WO 2020123013 A1 6/2020

\* cited by examiner

*Primary Examiner* — Zeshan Qayyum
(74) *Attorney, Agent, or Firm* — Buckley, Maschoff & Talwalkar LLC (57) ABSTRACT

Systems, methods and computer program code are provided to select a payment gateway for use in a transaction which include receiving information identifying the transaction, identifying a set of available payment gateways, calculating a success probability associated with each payment gateway in the set of available payment gateways, selecting the payment gateway having the highest success probability, and causing the transaction to be processed using the selected payment gateway.

19 Claims, 6 Drawing Sheets

DYNAMIC GATEWAY SELECTION

BACKGROUND

Payment transactions typically involve the use of a payment gateway. Payment gateways are used to perform transaction processing to route transactions to financial institutions for approval as well as to perform other processes including cardholder authentication, fraud analysis, etc. Different payment gateways have different performance characteristics, pricing and processing results.

It would be desirable to provide dynamic gateway selection systems and methods that allow payment gateways to be selectively used based on criteria relating to reliability, performance, cost and processing results.

SUMMARY

According to some embodiments, systems, methods and computer program code to dynamically select gateways are provided. Pursuant to some embodiments, methods include receiving information identifying the transaction, identifying a set of available payment gateways, calculating a success rate associated with each payment gateway in the set of available payment gateways, selecting the payment gateway having the highest success rate, and causing the transaction to be processed using the selected payment gateway.

In some embodiments, the information identifying the transaction includes information identifying a merchant, a payment amount, and payment account information, the payment account information including a bank identification number ("BIN"). In some embodiments, processing includes identifying at least a first payment gateway that is incompatible with the BIN and removing the at least first payment gateway from the set of available payment gateways.

In some embodiments, processing includes identifying at least a first configuration parameter associated with the merchant. The at least first configuration parameter may specify a merchant preference for at least one of: (i) a maximum transaction cost value, (ii) a minimum success rate threshold, and (iii) a maximum latency value.

In some embodiments, processing further includes identifying at least a first payment gateway having a latency value that exceeds the maximum latency value and removing the at least first payment gateway from the set of available payment gateways. In some embodiments, processing further includes identifying at least a first payment gateway having a transaction cost that exceeds the maximum cost value and removing the at least first payment gateway from the set of available payment gateways.

A technical effect of some embodiments of the invention is an improved, accurate and efficient way of dynamically routing transactions to payment gateways. Embodiments allow a wide variety of different gateways and different processing conditions to be used. With these and other advantages and features that will become hereinafter apparent, a more complete understanding of the nature of the invention can be obtained by referring to the following detailed description and to the drawings appended hereto.

DETAILED DESCRIPTION

Some payment service providers process huge numbers of payment transactions through a number of different payment gateways. Using the most appropriate payment gateway for a given transaction can result in substantially improved processing times, accuracy of results, reduced costs, and improved customer satisfaction. Embodiments described herein provide improved systems and methods for dynamically selecting a payment gateway to improve processing times, an increased number of successful transactions, accuracy and customer satisfaction while reducing transaction costs. As used herein, the term "automated" or "automatic" may refer to, for example, actions that can be performed with little or no human intervention. Pursuant to some embodiments, the dynamic selection of payment gateways may be performed in an automated fashion as will be described further herein.

Features of some embodiments will now be described by first referring to FIG. 1 which is a block diagram of a system 100 depicting an example environment in which a gateway selection platform 120 pursuant to the present invention may operate. As shown, the system 100 in the example environment includes a payment service provider 110 which receives payment requests from a merchant 104. The payment requests involve payment transactions between the merchant 104 and a consumer 102. In actual implementation, there may be a number of different consumers 102 and merchants 104 conducting a number of transactions. There may also be a number of different payment service providers 110. Pursuant to some embodiments, the payment service provider 110 interacts with a gateway selection platform 120 which functions to select one or more payment gateways 140a-n for use in processing the payment transaction. As will be described further herein, the selection of which gateway to use may be based on a number of different factors, including information about the payment transaction (including information associated with the merchant 104, information associated with the payment method used by the consumer 102, the amount of the transaction, the type of goods or services being purchased, etc.), preference information (e.g., such as merchant preferences), as well as a number of statistics or data associated with individual payment gateways 140. As will be described further herein, the gateway selection platform 120 may be configured to dynamically select payment gateways 140a-n based on factors such as cost, success rates, margins, latency, and other factors relating generally to the relative overall "health"$_{[SB1]}$ of each gateway 140 that point to the greatest likelihood of completing a successful transaction. While the gateway selection platform 120 is shown in a separate block from the payment service provider 110, in some implementations, the gateway selection platform 120 may be a part of a payment service provider 110. In some embodiments, a gateway selection platform 120 may interact with one or more payment service providers 110.

For convenience and ease of exposition, a number of terms are used herein. For example, as embodiments relate to payment transactions and the processing of those payment transactions, the terms "consumer", "payment card", "merchant", "payment service provider", and "payment gateway" will be used for convenience and ease of exposition. As used herein, the term "consumer" generally refers to an individual or entity (such as consumer 102 of FIG. 1) involved in a purchase transaction with a merchant (e.g., such as a consumer purchasing an item from an e-commerce store using a credit card). The term "consumer" is not meant to imply that the purchaser is an individual (as a "consumer" may also be a business or other entity).

As used herein, the term "payment account" is used for convenience and is used to refer to the payment instrument that the consumer 102 is attempting to use in the payment transaction and may include credit cards, debit cards, gift cards, bank accounts, vouchers, or other payment instruments. The term "merchant" is used for convenience and is used to refer to an entity (or, in some cases, an individual) that is involved in a payment transaction with the consumer (e.g., such that the consumer is attempting to conduct a payment transaction using a payment account to cause funds to be transferred to the merchant in exchange for goods or services). The consumer 102 may interact with the merchant 104 remotely (e.g., via an e-commerce store or via mail-order or telephone), or in person at a retail location.

Figure 1:
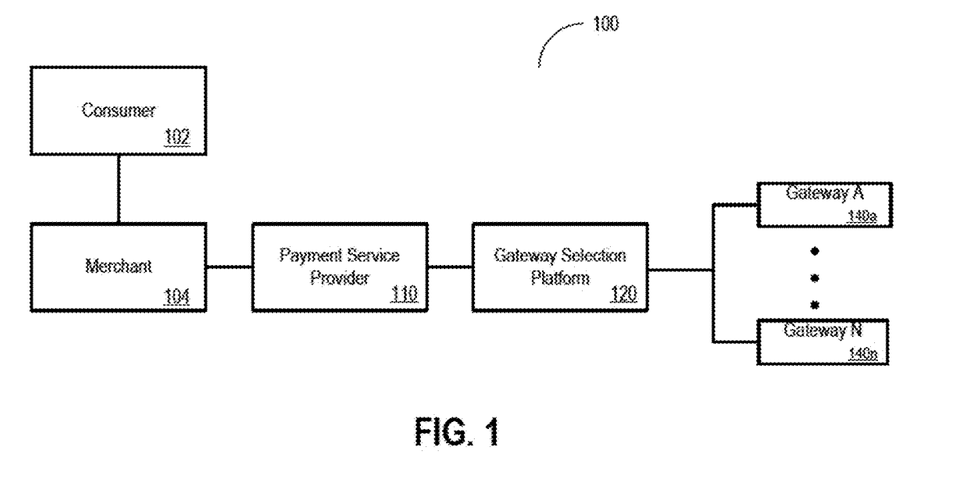
FIG. 1 is block diagram of a system pursuant to some embodiments.

As used herein, the term "payment service provider" is used to refer to an entity operating a platform such as the payment service provider platform 110 of FIG. 1. The payment service provider 110 may perform a number of payment related services; however, for simplicity and ease of exposition, the payment service provider 110 will be described herein as providing the service of receiving payment requests from merchants and ensuring those payment requests are processed. The payment service provider 110 also communicates the result of a payment transaction to the merchant 104 and the consumer 102. An example of a payment service provider 110 is the assignee of the present application, PayU.

As shown in FIG. 1, the payment service provider 110 interacts with a gateway selection platform 120 to cause the selection of a gateway 140 for use in processing a given transaction. As used herein, the term "payment gateway" or "gateway" is used to refer to a service or function that is provided which allows payment information (such as account information associated with a credit card, debit card, bank account or the like) to be processed to conduct a payment transaction. A payment gateway 140, for example, may provide functionality to verify a customer's payment information, process a payment and initiate a settlement for the payment transaction. In general, a payment gateway 140 is typically operated as a remote service or function by an entity that will be referred to herein as a payment gateway (e.g., both the entity and the service will be referred to as the "payment gateway"). The services of a payment gateway 140 may, for example, be initiated via an application programming interface ("API").

Commonly, service providers that operate payment gateways 140 require that an entity that wishes to take advantage of the payment gateway services establish an account with the payment gateway service provider. Once an account is established, API credentials are provided and the services may be used. In general, many payment gateways 140 operate in a request/response model. An entity that wishes to have a payment transaction processed by a payment gateway 140 will provide information about the payment transaction to the gateway 140 in a "request" message. The payment gateway 140 will then attempt to process the payment transaction (e.g., to determine if the payment account information is valid, to interact with an account issuer to determine if there are sufficient funds available, etc.) and will return a "response" message with information identifying whether the payment was processed or if there was an exception or error.

In describing features of some embodiments, example transactions will be described in which the payment service provider 110 receives a payment authorization request message from a merchant 104 (or where the payment service provider 110 creates the payment authorization request message in conjunction with the merchant 104), uses information from that message to dynamically select a payment gateway 140, and then transmits the payment authorization request message to that selected gateway 140. Pursuant to some embodiments, as shown in FIG. 1, the dynamic selection of a payment gateway 140 is performed by a gateway selection platform 120. In some embodiments, the gateway selection platform 120 is operated to route the request message to the selected gateway 140, while in some embodiments, the gateway selection platform 120 returns the dynamic selection information to the payment service provider 110 which then routes the request message to the selected gateway 140.

Because payment gateways are essentially software services, the way the gateway is configured may result in different performance from another payment gateway. Some gateways may be better suited to handling transactions involving payment accounts from certain banks or different types of bank accounts. Some gateways may be slower than others. In general, because gateways are configured differently and are hosted on different infrastructures, there can be great variation in gateway performance. For example, different gateways may respond more slowly than others. This response time will be generally described herein as the "latency" (or the time between when a payment authorization request message is presented to the gateway and time when the gateway returns a response).

Payment transactions can fail for a number of reasons. For example, some payment gateways may be configured to only handle certain types of transactions (e.g., such as transactions involving certain payment card brands). A transaction involving a non-supported payment card brand will result in a failure message or response from that payment gateway. Transactions can also fail as a result of a non-responsive payment gateway (e.g., if the API is unreachable or non-responsive), if a card issuer is not available, due to server errors on the part of the payment gateway service provider, or other technical reasons. These types of failures are different than declines or failures that are a result of the inability to authenticate the payment device (e.g., if the cardholder cannot be identified, if there are insufficient funds, if the payment device has expired or been reported as lost or stolen, etc.). As used herein, failures that relate to the performance of a payment gateway 140 will be referred to as "genuine failures" (and, in general, will be used to compute a success rate of the payment gateway 140). Failures that are generally not related to the performance of a payment gateway 140 (e.g., such as when a consumer used a payment device that was lost or stolen or had insufficient funds) will not be counted against the success rate of the payment gateway 140. Embodiments track and analyze these genuine failures to allow the dynamic selection of gateways such that the likelihood of failed transactions will be reduced. Further details of such genuine failures will be provided further below.

Although not shown in FIG. 1, payment gateways 140 typically communicate with one or more payment networks (such as those operated by MasterCard International Incorporated, Visa International Incorporated, etc.) as well as one or more issuer banks or other financial institutions.

According to some embodiments, an "automated" gateway selection platform 120 may receive one or more inputs (such as payment request messages) and perform processing to automatically produce one or more outputs associated with the dynamic selection of a payment gateway 140 as will be described further herein.

The system 100 can include various types of computing devices. For example, the consumer 102 may operate one or more user device(s) to interact with a merchant 104 to conduct a transaction. For example, the consumer 102 may operate devices such as mobile devices (such as smart phones), tablet computers, laptop computer, desktop computer, or any other type of computing device that allows a user to interact with a merchant 104 to conduct a transaction. The gateway selection platform 120, merchant 104, payment service provider 110 and one or more gateways 140 can include one or more computing devices including those explained below with reference to FIG. 6. In some embodiments, the gateway selection platform 120 includes a number of server devices and/or applications running on one or more server devices. For example, the gateway selection platform 120 may include an application server, a communication server, a web-hosting server, or the like.

The devices of system 100 may communicate using any communication platforms and technologies suitable for transporting data and/or communication signals, including any known communication technologies, devices, media, and protocols supportive of data communications. For example, the devices of system 100 may exchange information via any wired or wireless communication network such as the Internet, an intranet, or an extranet. Note that any devices described herein may communicate via one or more such communication networks.

Although a single gateway selection platform 120 is shown in FIG. 1, any number of such devices may be included. Moreover, various devices described herein might be combined according to embodiments of the present invention. For example, in some embodiments, the gateway selection platform 120 and one or more of the databases or other modules described elsewhere herein might be co-located and/or may comprise a single apparatus.

Figure 2:
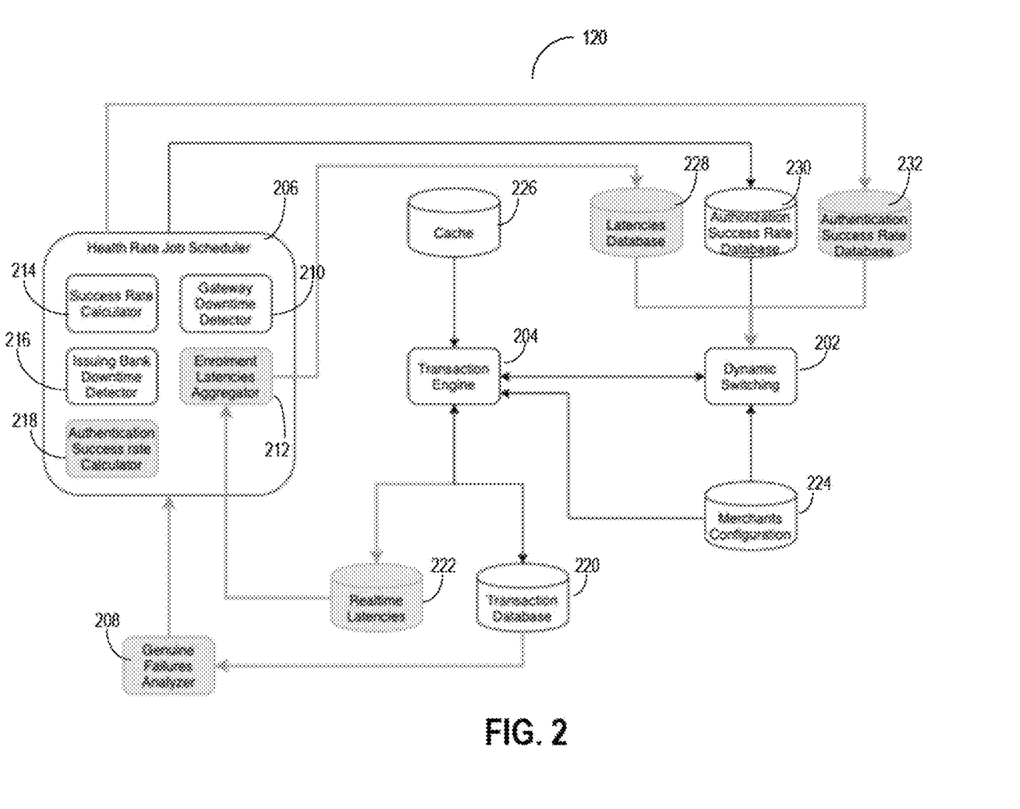
FIG. 2 is a block diagram of portions of a system pursuant to some embodiments.

Reference is now made to FIG. 2 where further details of a gateway selection platform 120 are shown pursuant to some embodiments. The gateway selection platform 120 shown in FIG. 2 may comprise an implementation of the gateway selection platform 120 of FIG. 1 but is not limited thereto. As shown, gateway selection platform 120 comprises a number of software modules or components including a dynamic switching module 202, a transaction engine 204, a health rate job scheduler 206 and a genuine failures analyzer 208. These modules or components interact as will be described herein to dynamically select a payment gateway 140 when a payment request is received by the gateway selection platform 120. The modules or components 202, 204, 206, and 208 access a number of datastores to perform this dynamic selection processing, including, for example, a transaction database 220, a real-time latency database 222, a merchant configuration database 224, a cache 226, a latencies database 228, an authorization success rate database 230, and an authentication success rate database 232. Those skilled in the art, upon reading the present disclosure, will appreciate that a different configuration of databases and software modules may be used so long as the system performs processing as described herein.

While not shown in FIG. 2, the gateway selection platform 120 may also include or comprise an application server that facilitates overall operation of the gateway selection platform 120 as described herein. Embodiments are not limited to the architecture of the platform 120 as shown in FIG. 2. For example, some or all of the databases may be implemented on a single database platform (e.g., as tables or separate databases within that platform) according to some embodiments. Further, embodiments may include additional or different software modules, components and/or datastores.

Pursuant to some embodiments, the dynamic switching module 202 is configured to calculate the success rates (the "Success Rate" or "Success Probability") of a particular gateway selection. In some embodiments, the dynamic switching module 202 calculates a predicted success rate of a particular gateway using Bayesian probability$_{[SB2][VM3]}$ based on (i) a prior success probability (the "Prior Success Probability"), (ii) a current success rate, such as the ratio of current success count to the current total count (the "Current Success Rates"), and (iii) a prior success rates factor of between 0 and 1, based on the current data size (the "Prior Success Rates Factor"). The Prior Success Probability associated with a gateway is the Success Probability (or "Success Rate") that was previously calculated for that gateway for a prior transaction (e.g., the prior time that the algorithm was run for the gateway). This probability relates to the likelihood of the transaction being successful. Pursuant to some embodiments, the Current Success Rate for a gateway is the percentage of successful transactions using the gateway versus the total transactions that have been processed using the gateway. The Current Success Rate is based on historical transaction data for each gateway. The Prior Success Rate Factor for a gateway is a factor used to adjust the probability so that it is closer to the observed or actual value of the Success Rate of the last iteration involving the gateway. This factor serves as feedback into the algorithm so that the algorithm adjusts based on actual performance. Based on this data, the dynamic switching module 202 may calculate a success probability for a given gateway as equal to ((Prior Success Probability)*(Prior Success Rates Factor)+Current Success Rates)/(1+Prior Success Rates Factor).

In some embodiments, the dynamic switching module 202 operates on data from a number of data sources, including data from a latencies database 228, an authorization success rate database 230 and an authentication success rate database 232 which include gateway performance data about each gateway 140a-n. The latency database 228 includes data that indicates the time it takes for a gateway to respond to a request. In some embodiments, other data that may affect a gateway's latency or ability to respond may also be provided to the dynamic switching module 202 such as, for example, data indicating the availability of a datacenter (e.g., such as an outage at a datacenter) or data indicating the failure of one or more intermediate services upon which a particular gateway depends. That is, data about the availability of particular gateways may include historical performance data (such as latency data) as well as real-time or current data about conditions that potentially could impact a gateway's ability to process a transaction.

The authorization success rate database 230 includes data that indicates the rate at which a gateway successfully authorizes payment transactions (as opposed to the rate at which that gateway declines payment transactions). The authentication success rate database 232 includes data that indicates the rate at which a gateway successfully authenticates a consumer during a payment transaction (as opposed to the rate at which the gateway fails to authenticate a consumer during payment transactions). These databases provide the dynamic switching module 202 with historical gateway performance information about each gateway 140a-n which may be used by the dynamic switching module 202 in the calculation of a predicted success rate as described herein. In some embodiments, the success probability may be computed in real-time (for current transactions). In some embodiments, a historical success probability (daily/weekly) may be calculated so that an overall view of the relative strength of different gateways performance may be determined.

Pursuant to some embodiments, algorithms used by the dynamic switching module 202 may be enhanced using machine learning techniques$_{[SB4][VM5]}$. For example, the dynamic switching module 202 may include one or more models that are trained used reinforcement learning techniques using actual performance data from different data sources including data sources 228, 230 and 232. For example, one or more models may be created which may predict which gateway 140a-n will perform better given certain conditions associated with a transaction (e.g., such as time of day, etc.). Pursuant to some embodiments, a gateway selection may be performed using continuous probability distribution calculation (e.g., such as beta distribution). In some embodiments, reinforcement learning models may be used to more accurately predict which gateway 140 will perform best in a given situation. In some embodiments, the reinforcement learning may be performed in conjunction with a Markov decision process.

In some embodiments, the dynamic switching module 202 also has access to merchant preference data stored in a merchant configuration database 224. For example, each merchant 104 may communicate one or more preferences to the gateway selection platform 120 (or to the payment service provider 110 for communication to the gateway selection platform 120). For example, a merchant 104 may establish preferences relating to routing rules or preferences. A merchant 104 may prefer to reduce cost over latency. A merchant 104 may also prefer to work with particular payment gateways 104. The configuration database 224 may store a number of configuration options related to specific merchants or groups of merchants to customize how the dynamic switching module 202 selects payment gateways 140. The configuration options may influence routing based on variables relating to payment gateway health, cost, margin or latencies.

In some embodiments, gateway selection platform 120 includes a module such as a genuine failures analyzer 208 that is configured to analyze transaction failures associated with transactions that the transaction engine 204 has handled. For example, when the gateway selection platform 120 has selected a gateway 140 for use in processing a transaction, transaction engine 204 may be configured to transmit a payment authorization request message (including details of the proposed transaction between a consumer 102 and merchant 104) to the selected gateway 140. The payment authorization request message includes the transaction amount and information identifying the consumer's payment account. The message is transmitted to the selected gateway 140 and the gateway 140 either returns a payment authorization response (which can include an approval or a decline) or some type of an error message. For the purposes of this discussion, a "failure" may be any transaction that failed to be approved. As such, there are different types of failures, including "genuine" failures (where the gateway performed as expected and the transaction was declined for normal decline reasons) as well as failures that relate to the performance of a gateway (e.g., where the gateway 140 was unresponsive or some technical issue prevented the transaction from proceeding). Pursuant to some embodiments, the genuine failures analyzer 208 analyzes responses received from payment gateways 140 to determine whether a transaction failed for some reason other than a normal "decline".

Unfortunately, different payment gateways 140 have different response codes and it can be difficult to determine whether a transaction failed or was simply declined. Embodiments use a translation table to map different response codes to a standardized set of failure reasons (some of which are "genuine" failures that do not result in a reduction in a gateway's success rate). In this manner, embodiments allow the gateway selection platform 120 to interact with many different payment gateways 140 (that have different failure and response reason codes) and normalize the response data in a way that allows comparison of the results from different gateways 140. These standardized results can be used by the gateway selection platform 120 to calculate the success rates of different payment gateways 140a-n, allowing the dynamic switching module 202 to select the healthiest gateway 140 for a given transaction.

Examples of different response codes or messages that can be received from different gateways 140 include the following messages that are associated with failed transactions that are "genuine" failures (e.g., they indicate that a transaction failed to process, but in these examples, the failure was for expected reasons): "Lost Card/Stolen Card", "Insufficient Funds", "Card has been classified as lost and has been blocked", "Not sufficient funds", etc. As shown, different failure reasons provided by different gateways can vary significantly in their language. For example, the failure reasons "Not sufficient funds" and "Insufficient funds" may be mapped to a standard reason code "Insufficient Funds". The failure reasons "Lost Card/Stolen Card" and "Card has been classified as lost and has been blocked" may be mapped to a standard code "Lost Card".

Pursuant to some embodiments, these failures that are generally related to user inaction may be classified as "dropped" transactions. In some embodiments, "dropped" transactions are considered "genuine" failures (and do not result in a reduction in a gateway's success rate).

A number of "failed" transaction reasons are not classified as "genuine" failure reasons. These types of failed transactions do result in a reduction in a gateway's success rate. For example, response reasons (returned from gateways 140) associated with these types of failed transactions may include "Unable to process the request", "Something went wrong in processing the request", "Transaction failed at bank end", "Transaction failed due to bank server timeout", etc. These types of failure responses may be mapped to one or more common response types (e.g., such as "Authorization Failure" or the like). These failures may be considered as failures associated with the performance of the payment gateway 140 and may be used by the success rate calculator 214 to reduce the success rate of the associated gateway 140.

In some embodiments, gateway selection platform 120 may include one or more health rate job schedulers 206 which are configured to periodically (or, in some embodiments, continuously) perform monitoring tasks or perform calculations. For example, as shown in FIG. 2, in some embodiments, An enrollment latencies aggregator module 212 may be a service that receives real-time latency data from transactions involving different payment gateways 140a-n. For example, the real-time latency data may come from a real-time latency database 222 that is fed from a transaction engine 204 of the gateway selection platform 120. The transaction engine 204 may be a module configured to transmit payment authorization requests to gateways 140 selected by the dynamic switching module 202. The transaction engine 204 may log the timestamp associated with the time when a payment authorization request message is presented to a payment gateway 140 as well as a timestamp associated with the time when the payment gateway 140 responds to the request. This real-time latency data may be stored and accumulated in a real-time latency database 222 for use by the enrollment latencies aggregator module 212. The module 212 may generate, for each payment gateway 140*a*-*n*, data about each gateway's latency over different time periods (e.g., such as the present hour, the present day, the past week, etc.). Data from the enrollment latencies aggregator module 212 is provided to latencies database 228 for use by the dynamic switching module 202 as discussed above.

A gateway downtime detector 210 may be a service that continually monitors the status of gateways 140*a*-*n*. For example, the gateway downtime detector 210 may ping or query individual payment gateways 140*a*-*n* to determine the availability (or non-availability) of individual payment gateways 140*a*-*n*. Data from this monitoring may be provided to the dynamic switching module 202 on demand or the data may be published in a manner that is accessible to the dynamic switching module 202. For example, if the gateway downtime detector 210 determines that gateway 140*a* is currently unavailable, then dynamic switching module 202 will be informed so that the dynamic switching module 202 will not consider gateway 140*a* for selection while the gateway 140*a* is in an unavailable condition.

In some embodiments, an issuing bank downtime detector 216 may also be provided. Similar to the gateway downtime detector 210, the issuing bank downtime detector 216 may be configured to periodically (or continually) monitor the availability of one or more issuing banks to process transactions. For example, the issuing bank downtime detector 216 may ping or query processing systems associated with individual issuing banks. The availability or non-availability of an issuing bank is communicated to the dynamic switching module 202 for use in determining how to route transactions.

The health rate job scheduler 206 may also include a success rate calculator 214 which is configured to calculate success rates based on data from the transaction database 220. The success rate calculator 214 may use data filtered by the genuine failures analyzer 208 to compute a success rate for particular gateways. In some embodiments, the success rate may be automatically calculated for each gateway on a scheduled cycle (e.g., every few minutes, once a new transaction record is received, etc.). In some embodiments, the success rate may be calculated on request from the dynamic switching module 202.

An authentication success rate calculator 218 may also be provided which is configured to calculate success rates based on authentication data. In some embodiments, the success rate may be automatically calculated for each gateway on a scheduled cycle (e.g., every few minutes, once a new transaction record is received, etc.). In some embodiments, the success rate may be calculated on request from the dynamic switching module 202. The authentication success rate data generated by the authentication success rate calculator 218 may be stored in the authentication success rate database 232 for use by the dynamic switching module 202 in making routing decisions.

While a number of components, databases and modules are shown in FIG. 2, those skilled in the art, upon reading the present disclosure will appreciate that other configurations may be provided. For example, some or all of the databases may be combined, and some or all of the modules may be combined into one or more applications. Further, pursuant to some embodiments one or more machine learning modules may be provided to enhance the accuracy of some operations [SB6][VM7].

Figure 3:
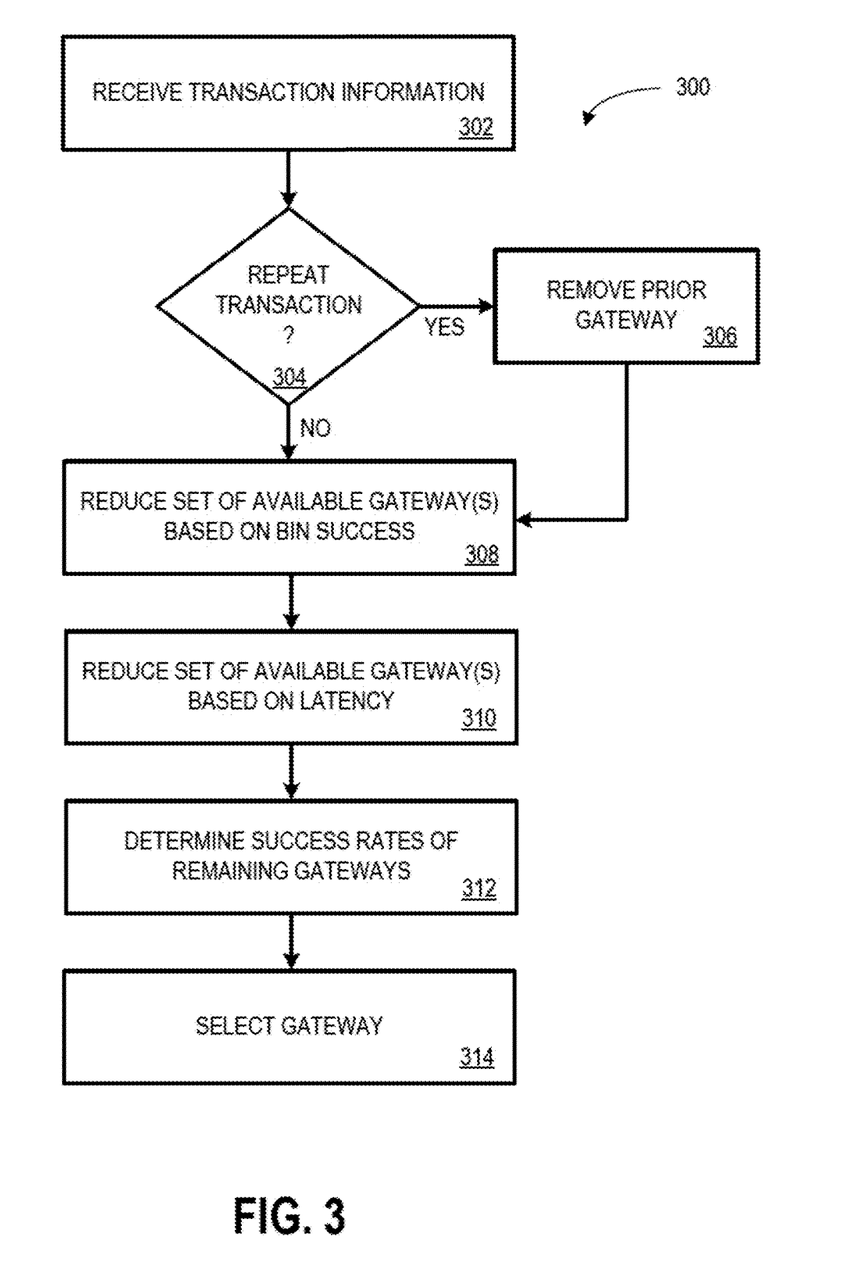
FIG. 3 illustrates a process pursuant to some embodiments.

Reference is now made to FIG. 3 where a dynamic gateway selection process 300 is shown that might be performed by some or all of the elements of the gateway selection platform 120 described with respect to FIGS. 1 and 2 according to some embodiments of the present invention. The flow charts and process diagrams described herein do not imply a fixed order to the steps, and embodiments of the present invention may be practiced in any order that is practicable. Note that any of the methods described herein may be performed by hardware, software, or any combination of these approaches. For example, a computer-readable storage medium may store thereon instructions that when executed by a machine result in performance according to any of the embodiments described herein.

Process 300 begins at 302 where transaction information is received. The transaction information may be received from a merchant 104 and may involve a consumer 102. The transaction information may be formatted as a payment authorization request message and may include information such as: information identifying the merchant, a transaction amount, a transaction type, information identifying a payment account provided by the consumer 102, etc. The information identifying the payment account may further include a bank identification number or "BIN" that identifies an issuer of the payment account as well as a type of payment account (e.g., such as whether the account is related to a MasterCard payment card or a Visa payment card). In some embodiments, information regarding a payment mode may also be provided (e.g., in situations where different modes of payment may be available, such as, for example, whether the payment is a one-time payment, whether it is a recurring payment, whether it is an installment payment, etc.).

Processing continues at 304 where a determination is made whether this transaction is a repeat transaction or not. For example, in some situations, a consumer 102 may attempt a payment transaction with a merchant 104 and receive a technical failure reason. For example, the transaction may have failed because the issuer was not available. In some situations, the consumer 102 may be prompted to retry the transaction if they so desire. Such a retry will be identified at 304 and processing will continue at 306 where the payment gateway 140 associated with the prior (failed) transaction will be removed from a set of potential payment gateways to be used in this transaction.

If the transaction is not a repeat transaction, processing continues at 308 where the gateway selection platform 120 performs processing to reduce the set of available payment gateways 140 based on the BIN received at 302. For example, processing at 308 may include comparing the BIN received at 302 with authorization success rate database 230 to determine a success rate of the BIN at each payment gateway 140 in the set of available payment gateways. Those payment gateways 140 with the lowest success rates for that BIN may be removed from the set of available payment gateways for this transaction. A BIN success threshold may be used to reduce the set and the threshold may be obtained, for example, from a configuration database 224 (e.g., processing at 308 may remove all payment gateways have a BIN success rate less than the threshold).

Processing continues at 310 where the gateway selection platform 120 performs processing to further reduce the set of available payment gateways based on gateway latency data. For example, processing at 310 may include identifying the latency data for each remaining gateway in the set of available gateways and removing those gateways having an unacceptable latency value. The configuration data 224 may include a threshold value establishing what latency values are acceptable.

Processing continues at 312 where the further reduced set of available payment gateways is analyzed to determine the success rates of each of the remaining payment gateways. The success rates may be calculated as described above and may be based on a Bayesian probability$_{[SB8][VM9]}$ using (i) Prior Success Probability, (ii) Current Success Rates, and (iii) a Prior Success Rates Factor. Processing at 312 may include reducing the set of available payment gateways by eliminating those gateways having a success rate below a threshold value (where the threshold value may be obtained from, for example, a configuration database 224).

Processing continues at 314 where a payment gateway is selected from the further reduced set of available payment gateways. If, at 314, only a single payment gateway remains in the set of available payment gateways, then that payment gateway is selected for use in the present transaction. If more than one payment gateway remains in the set, then those remaining payment gateways may be sorted by success rate in descending order and the payment gateway with the highest success rate will be selected as the payment gateway for use in the present transaction. In this manner, depending on the configuration parameters, embodiments allow payment transactions to be routed to the available payment gateway that is likely the best suited for the transaction. Other filters may also be used that are not shown in FIG. 3. For example, a processing step may be added to filter out payment gateways based on cost or margin (e.g., a cost and/or margin threshold may be stored in the configuration database 224).

Figure 4:
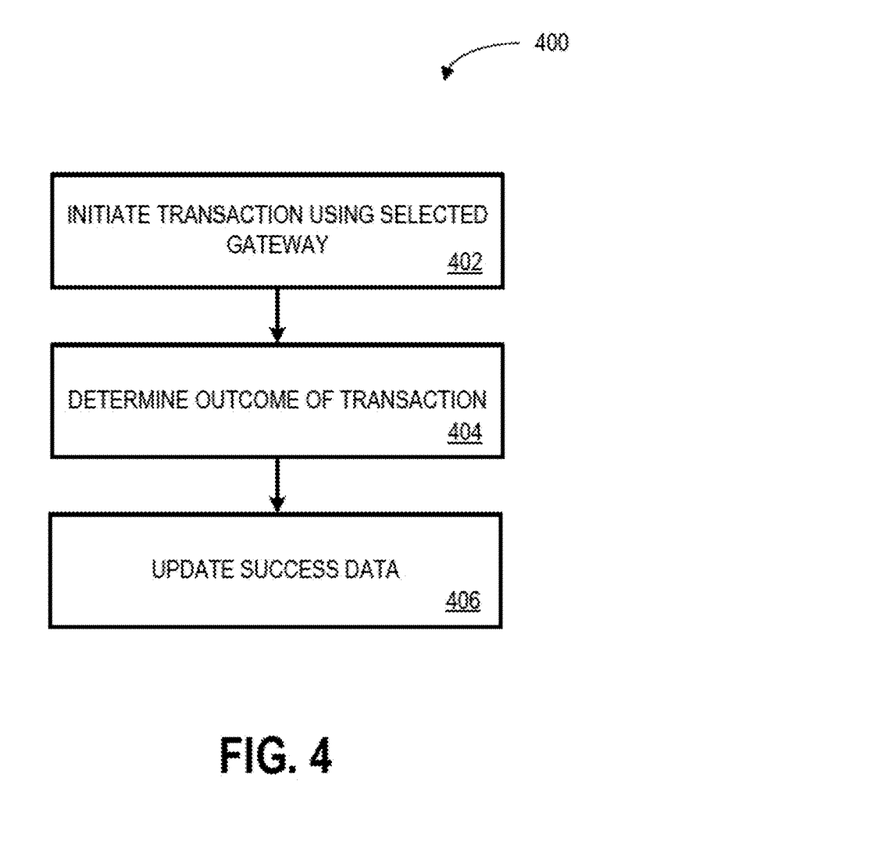
FIG. 4 illustrates a further pursuant to some embodiments.

Once process 300 has resulted in the selection of a payment gateway 140 for use in the present transaction, processing continues with the process 400 of FIG. 4 at step 402 where the gateway selection platform 120 initiates a transaction using the selected payment gateway. Based on the selection of the gateway, the transaction engine 204 may be operated to post or otherwise transmit a payment authorization request message to the selected gateway (e.g., using account credentials and code associated with that selected gateway).

Processing continues at 404 where the gateway selection platform 120 is operated to determine the outcome of the transaction. For example, the transaction engine 204 may receive a payment authorization response message from the selected payment gateway. The response code associated with the response message is analyzed to determine whether the transaction was approved or declined (and the message may further be returned to the merchant for further processing to complete the transaction). Processing at 404 may also include not receiving an authorization response message but instead receiving an error message or some other indication that the transaction failed (e.g., the API associated with the payment gateway may return a failure code).

Processing continues at 406 where the databases of FIG. 2 are updated based on the transaction data and the success data associated with that payment gateway is updated. For example, processing at 406 may include storing the calculated success probability so that it may be used as the "prior success probability" for the selected gateway in the next transaction that may involve that gateway. Further, processing at 406 may include comparing the calculated success probability for the transaction and the gateway with the actual results of the transaction with that gateway. For example, this may allow the calculation of a "prior success rates factor" involving the transaction and the gateway. In this manner, performance data associated with individual gateways are updated to include both estimated success probability data as well as actual success data. This allows embodiments to route transactions to gateways that have been dynamically and intelligently selected (by processing of FIG. 3) and also to ensure that performance data associated with each selected gateway is updated to influence the handling of future transactions.

Figure 5:
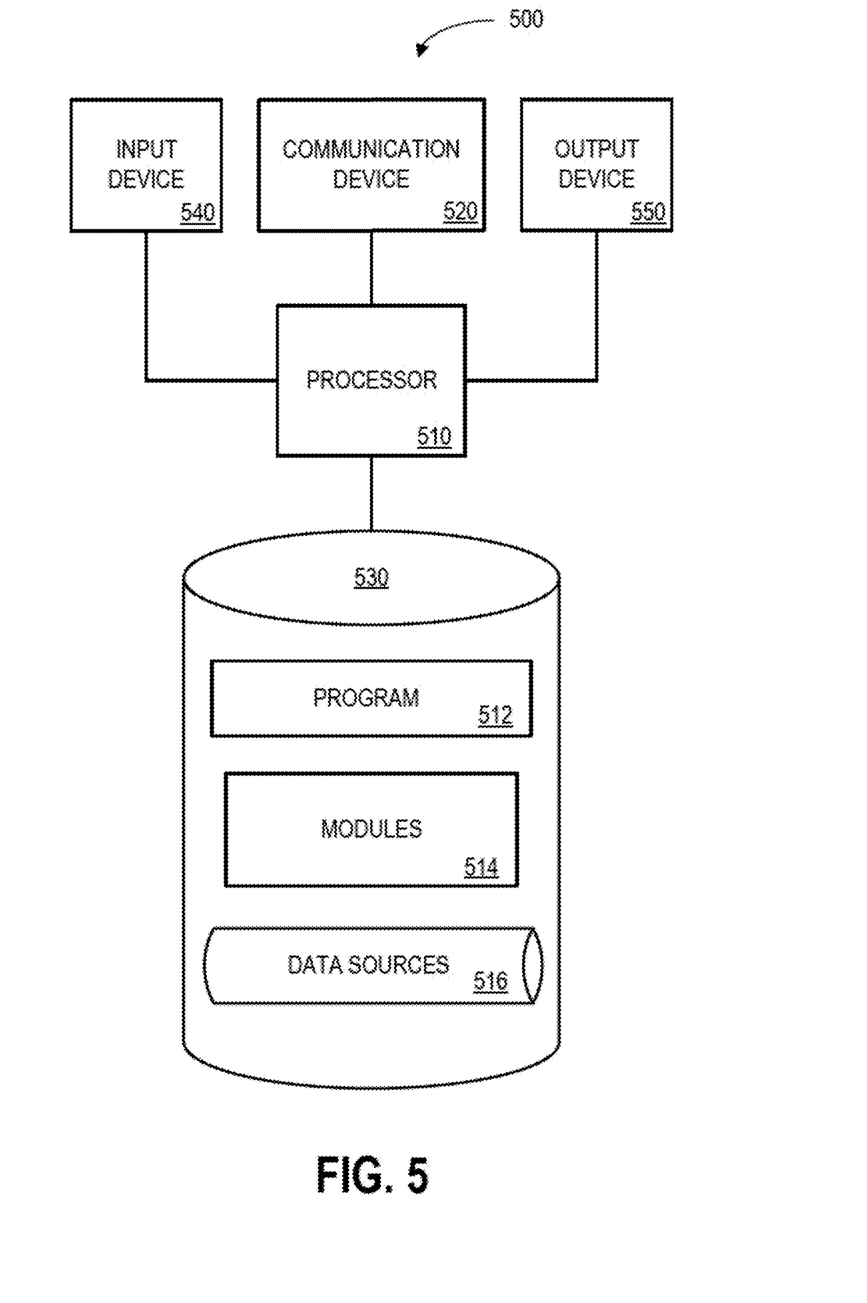
FIG. 5 is block diagram of a platform pursuant to some embodiments.

Embodiments described herein may be implemented using any number of different hardware configurations. For example, FIG. 5 illustrates a gateway selection platform 500 that may be, for example, associated with the system 100 of FIG. 1 as well as the other systems and components described herein. The gateway selection platform 500 comprises a processor 510, such as one or more commercially available central processing units (CPUs) in the form of microprocessors, coupled to a communication device 520 configured to communicate via a communication network (not shown in FIG. 5). The communication device 520 may be used to communicate, for example, with one or more input sources and/or user devices. The gateway selection platform 500 further includes an input device 540 (e.g., a mouse and/or keyboard to define rules and preferences) and an output device 550 (e.g., a computer monitor to display processing results and other information to a user).

The processor 510 also communicates with a storage device 530. The storage device 530 may comprise any appropriate information storage device, including combinations of magnetic storage devices (e.g., a hard disk drive), optical storage devices, mobile telephones, and/or semiconductor memory devices. The storage device 530 stores a program 512 and/or one or more software modules 514 (e.g., associated with the job scheduler module 206, the transaction engine 204, the switching module 202, and the genuine failures module 208 of FIG. 2) for controlling the processor 510. The processor 510 performs instructions of the programs 512 and/or software modules 514, and thereby operates in accordance with any of the embodiments described herein. For example, the processor 510 may receive information associated with a payment request message (e.g., relating to a transaction between a consumer 102 and a merchant 104) and then perform processing on that data to dynamically select a payment gateway 140 for use in processing the payment transaction. The dynamic selection may be performed, for example, based on rules and logic described above and in conjunction with a number of data sources 516 including, for example, transaction database 220, real-time latency database 222, latencies database 228, authorization success rate database 230 and authentication success rate database 232.

The programs 612 and software modules 614 may be stored in a compressed, uncompiled and/or encrypted format. The programs 612 and software modules 614 may furthermore include other program elements, such as an operating system, a database management system, and/or device drivers used by the processor 610 to interface with peripheral devices.

As used herein, information may be "received" by or "transmitted" to, for example: (i) the gateway selection platform 600 from another device; or (ii) a software application or module within the gateway selection platform 600 from another software application, module, or any other source.

Figure 6:
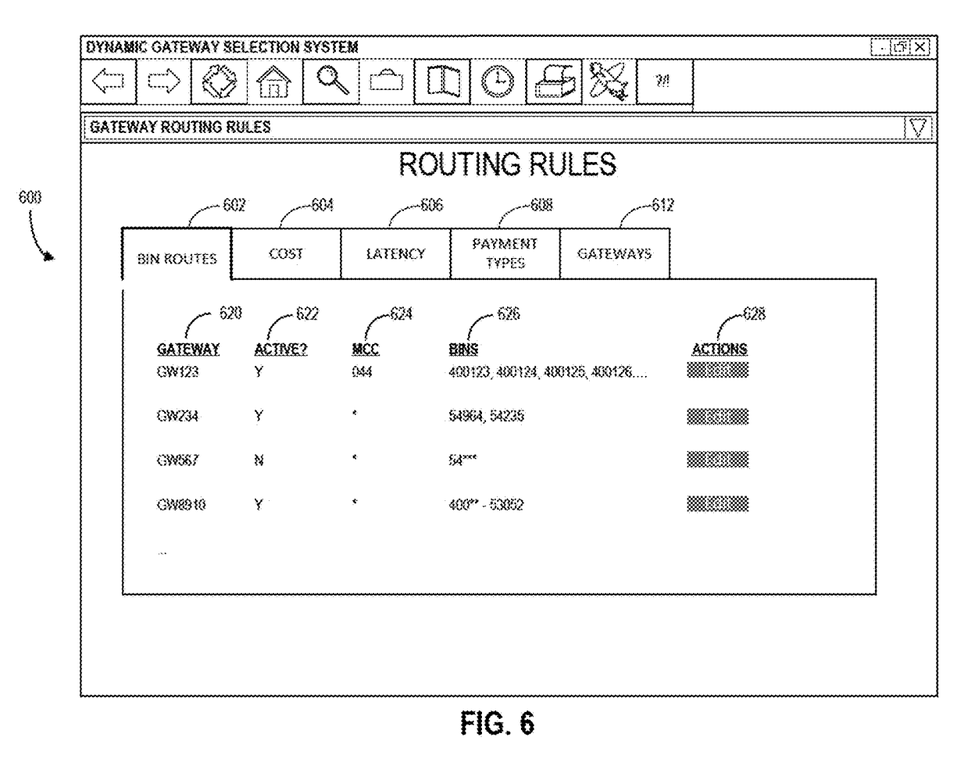
FIG. 6 is an illustrative user interface pursuant to some embodiments.

Pursuant to some embodiments, an administrator or other user may interact with the gateway selection platform 120 to establish, modify or otherwise administer rules associated with the platform 120. For example, an illustrative administrator interface 600 is shown in FIG. 6. The administrator interface 600 may be one of a number of interfaces that authorized administrators or other individuals may interact with in order to establish, modify or otherwise administer the routing rules associated with one or more merchants 104. In the illustrative interface 600 shown in FIG. 6, a user may edit one or more rules or values associated with BIN routes 602. As discussed above, some payment gateways may not support certain BINs or BIN ranges. Further, in some embodiments, specific BINs or BIN ranges may expressly be associated with certain payment gateways (e.g., those gateways may be specially configured or capable of processing transactions involving payments associated with certain BINs or BIN ranges). As shown in FIG. 6, a user may interact with the user interface 600 to perform actions 628 (e.g., such as to edit or delete information) associated with configuring BIN handling rules for one or more gateways (identified by gateway identifiers 620). The user may further be able to set a gateway's BIN handling rules as active or inactive (at 622). Further, in some embodiments, the user may specify that the BIN handling rules for a gateway be applied for transactions involving certain categories of merchants (e.g., as specified by one or more Merchant Category Codes or "MCCs" 624). In this way, a number of fine-grained controls may be established and maintained by an administrator allowing complex routing rules to be applied to transactions involving the platform 120.

A number of other configuration options may also be available, including the ability to update, edit or otherwise administer rules associated with transaction costs (604), gateway latency parameters (606), payment types (608), general gateway data (612) or the like. These configured routing parameters or rules may be applied in conjunction with the processing described herein to provide highly sophisticated routing.

The following illustrates various additional embodiments of the invention. These do not constitute a definition of all possible embodiments, and those skilled in the art will understand that the present invention is applicable to many other embodiments. Further, although the following embodiments are briefly described for clarity, those skilled in the art will understand how to make any changes, if necessary, to the above-described apparatus and methods to accommodate these and other embodiments and applications.

Although specific hardware and data configurations have been described herein, note that any number of other configurations may be provided in accordance with embodiments of the present invention (e.g., some of the information associated with the databases described herein may be combined or stored in external systems).

The present invention has been described in terms of several embodiments solely for the purpose of illustration. Persons skilled in the art will recognize from this description that the invention is not limited to the embodiments described but may be practiced with modifications and alterations limited only by the spirit and scope of the appended claims.

What is claimed:

1. A computer implemented method to select a payment gateway for use in a transaction, the method comprising:
   receiving, by a gateway selection platform, information identifying a transaction, the information including information identifying a merchant associated with the transaction;
   identifying, by the gateway selection platform, at least a first configuration parameter associated with the merchant, the at least first configuration parameter selected by the merchant prior to the transaction via a user interface, wherein the at least first configuration parameter includes a maximum latency value;
   identifying a set of available payment gateways, the set of available payment gateways determined at least in part by operating a gateway downtime detector to determine the current availability of each of a plurality of payment gateways;
   determining, for each available payment gateway in the set of available payment gateways, (i) a prior success probability determined based on the success rate of each available payment gateway in prior transactions processed by the gateway selection platform, (ii) a current success rate determined based on historical transaction data associated with each available payment gateway, and (iii) a prior success rate factor determined based on the size of historical transaction data;
   operating a dynamic switching module to calculate a success probability associated with each payment gateway in the set of available payment gateways based on the prior success probability, the current success rate and the prior success rate factor;
   selecting the payment gateway having the highest calculated success probability and that satisfies the maximum latency value, the maximum latency value satisfied at least in part by querying a real-time latency database to retrieve real-time latency data for each of the set of available payment gateways and comparing the real-time latency data of each available payment gateway with the maximum latency value, the real-time latency data for each available payment gateway generated by:
      periodically operating a transaction engine to transmit payment authorization requests to one of the available payment gateways;
      logging a first timestamp associated with the time when the payment authorization request is transmitted;
      logging a second timestamp associated with a time when a response to the payment authorization request is received; and
      storing the difference between the first timestamp and the second timestamp as the real-time latency data associated with the payment gateway; and
   causing the transaction to be processed using the selected payment gateway.

2. The computer-implemented method of claim 1, wherein the information identifying the transaction includes information identifying a payment amount, and payment account information, the payment account information including a bank identification number ("BIN").

3. The computer-implemented method of claim 2, further comprising:
   identifying at least a first payment gateway that is incompatible with the BIN; and
   removing the at least first payment gateway from the set of available payment gateways.

4. The computer-implemented method of claim 1, wherein the at least first configuration parameter further specifies a merchant preference for at least one of: (i) a maximum transaction cost value, and (ii) a minimum success rate threshold.

5. The computer-implemented method of claim 1, further comprising:
identifying at least a first payment gateway having a latency value that exceeds the maximum latency value; and
selecting the at least first payment gateway only if the at least first payment gateway is the only remaining gateway in the set of available payment gateways.

6. The computer-implemented method of claim 4, further comprising:
identifying at least a first payment gateway having a transaction cost that exceeds the maximum cost value; and
selecting the at least first payment gateway only if the at least first payment gateway is the only remaining gateway in the set of available payment gateways.

7. The computer-implemented method of claim 1, wherein the prior success probability is success rate calculated for the payment gateway in a prior transaction.

8. The computer-implemented method of claim 7, wherein the prior success rate factor is a factor to adjust the prior success probability associated with the prior transaction based on an actual success of the prior transaction.

9. The computer-implemented method of claim 1, wherein the current success rate is based on a percentage of successful transactions involving the payment gateway.

10. The computer-implemented method of claim 1, further comprising:
identifying that the transaction is a repeat transaction;
identifying a prior payment gateway used in a prior transaction; and
removing the prior gateway from the set of available payment gateways.

11. The computer-implemented method of claim 1, wherein causing the transaction to be processed using the selected payment gateway includes:
causing a payment authorization request message to be transmitted to the selected payment gateway.

12. The computer-implemented method of claim 11, further comprising:
receiving a response to the payment authorization request message, the response associated with one of a failure reason and a success reason.

13. The computer-implemented method of claim 12, further comprising:
mapping the failure reason to a standardized set of failure reasons.

14. The computer-implemented method of claim 13, further comprising:
determining that the failure reason is a type of failure reason that impacts the prior success rate of the payment gateway; and
storing the failure reason in a data store for use in calculating future success rates.

15. A system comprising:
a communication device to receive information associated with a transaction from a remote device, the information including information identifying a merchant associated with the transaction;
a processing unit; and
a memory storage device including program code that when executed by the processing unit causes to the system to:
identify at least a first configuration parameter associated with the merchant, the at least first configuration parameter selected by the merchant prior to the transaction via a user interface, the at least first configuration parameter includes a maximum latency value;
identify a set of available payment gateways, the set of available payment gateways determined at least in part by operating a gateway downtime detector to determine the current availability of each of a plurality of payment gateways;
determine, for each available payment gateway in the set of available payment gateways, (i) a prior success probability determined based on the success rate of each available payment gateway in prior transactions processed by the processing unit, (ii) a current success rate determined based on historical transaction data associated with each available payment gateway, and (iii) a prior success rate factor determined based on the size of historical transaction data processed by the processor;
operate a dynamic switching module to calculate a success probability associated with each payment gateway in the set of available payment gateways based on the prior success probability, the current success rate and the prior success rate factor;
select the payment gateway having the highest calculated success probability and that satisfies the maximum latency value, the maximum latency value satisfied at least in part by querying a real-time latency database to retrieve real-time latency data for each of the set of available payment gateways and comparing the real-time latency data of each available payment gateway with the maximum latency value, the real-time latency data for each available payment gateway generated by:
periodically operating a transaction engine to transmit payment authorization requests to one of the available payment gateways;
logging a first timestamp associated with the time when the payment authorization request is transmitted;
logging a second timestamp associated with a time when a response to the payment authorization request is received; and
storing the difference between the first timestamp and the second timestamp as the real-time latency data associated with the payment gateway; and
cause the transaction to be processed using the selected payment gateway.

16. The system of claim 15, wherein the information identifying the transaction includes information identifying a merchant, a payment amount, and payment account information, the payment account information including a bank identification number ("BIN").

17. The system of claim 16, further comprising program code that causes the system to:
identify at least a first payment gateway that is incompatible with the BIN; and
remove the at least first payment gateway from the set of available payment gateways.

18. The system of claim 15, wherein the at least first configuration parameter further specifies a merchant preference for at least one of: (i) a maximum transaction cost value, and (ii) a minimum success rate threshold.

19. The system of claim 18, further comprising program code that causes the system to:
   remove any payment gateway from the set of available payment gateways that at least one of (i) exceeds the maximum cost value and (ii) has a latency value that exceeds the maximum latency value.

* * * * *